(No Model.)
G. MARTIN.
PLOW.
No. 529,870.   Patented Nov. 27, 1894.
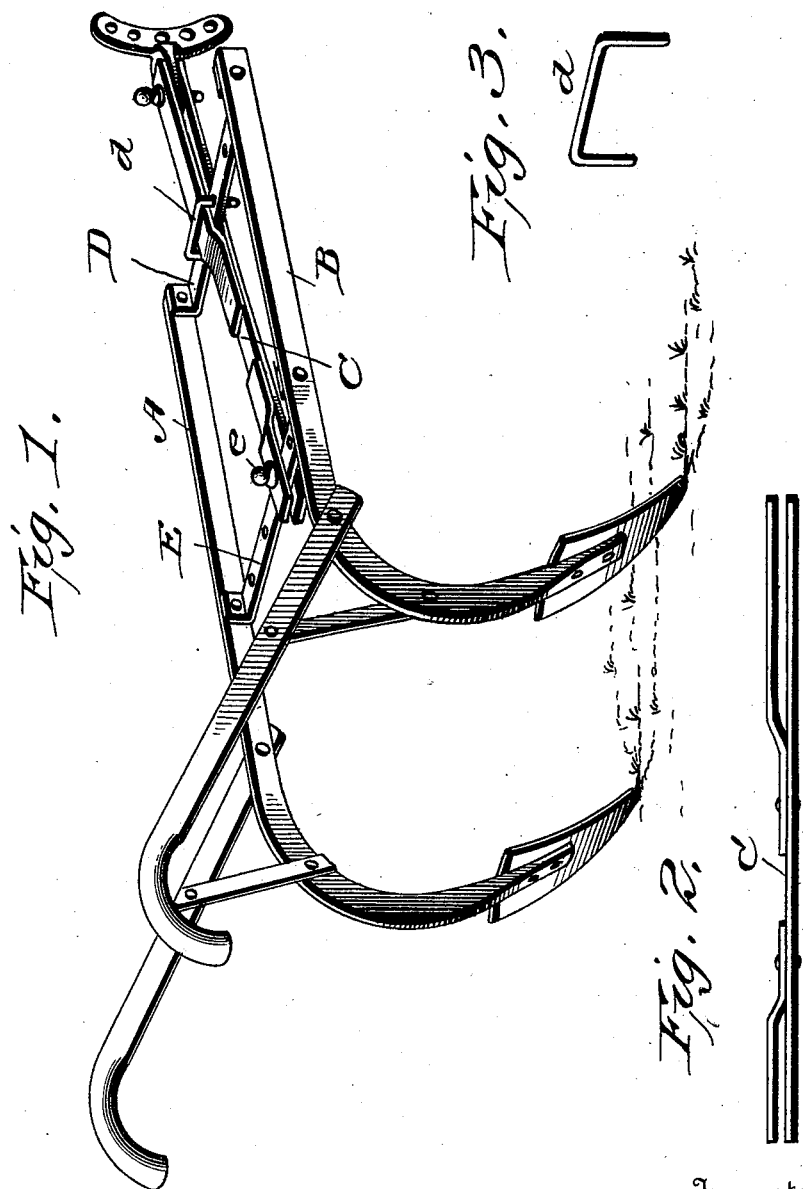
Witnesses
Inventor
George Martin.
By Attorneys

UNITED STATES PATENT OFFICE.

GEORGE MARTIN, OF ROCK RAPIDS, IOWA.

PLOW.

SPECIFICATION forming part of Letters Patent No. 529,870, dated November 27, 1894.

Application filed January 15, 1894. Serial No. 496,946. (No model.)

*To all whom it may concern:*

Be it known that I, GEORGE MARTIN, a citizen of the United States, residing at Rock Rapids, in the county of Lyons, State of Iowa, have invented certain new and useful Improvements in Plows; and I do hereby declare the following to be a full, clear, and exact description of the invention, such as will enable others skilled in the art to which it appertains to make and use the same.

This invention relates to gang plows, the object being to provide an adjustable draft connection for varying the point of application of the draft.

The improvement consists of short transverse bars connecting the beams having a series of openings, and a draft bar having independent adjustable connection with the said transverse bars as hereinafter will more fully appear.

In the accompanying drawings,—Figure 1 is a detail perspective view showing the application of the invention. Fig. 2 is a side elevation of the draft bar. Fig. 3 is a detail view of the fastening for securing the forward end of the draft bar to the front transverse bar.

A and B indicate plow beams of ordinary construction and disposition.

D and E are the transverse bars which connect the plow beams and space them the proper distance apart. These transverse bars are provided with a series of openings to receive the fastening devices by means of which the draft bar C is adjustably connected therewith. The transverse bar D is located near the forward ends of the plow beams and the transverse bar E near the rear end or close to the point where the said beams are deflected to form the standard. The draft bar C is constructed near each end to embrace the top and bottom sides of the cross bars D and E and is adjustably connected at its rear end with the bar E by means of a pin $e$. The front end of the draft bar is adjustably connected with the transverse bar D by means of a U-shaped fastening $d$ which straddles the said draft bar and has its bent ends inserted in openings on each side of the said draft bar. By means of the U-shaped fastening $d$ the front end of the draft bar is not weakened as it would be if perforated.

By properly adjusting the draft bar C on either of the transverse bars D or E the draft can be applied to the gangs at the required point to effect the desired result.

Having thus described my invention, what I claim, and desire to secure by Letters Patent, is—

In a gang plow, the combination with beams, and cross bars connecting the said beams and provided with a series of openings, of a draft beam constructed to embrace the top and bottom sides of the said cross bars, a pin adjustably connecting the rear end of the cross bar, with the rear cross bar, and a U-shaped fastening adapted to straddle the forward end of the said draft bar and enter openings on either side thereof to adjustably connect the same with the front cross bar, substantially as set forth for the purpose described.

In testimony whereof I affix my signature in presence of two witnesses.

GEORGE MARTIN.

Witnesses:
SIMEON REYNOLDS,
JOHN PAULSEN.